United States Patent
Schreter et al.

(10) Patent No.: US 9,811,549 B2
(45) Date of Patent: Nov. 7, 2017

(54) APPLYING A DATABASE TRANSACTION LOG RECORD DIRECTLY TO A DATABASE TABLE CONTAINER

(71) Applicants: Ivan Schreter, Mannheim (DE); Shiping Chen, San Francisco, CA (US); David Wein, Saint Paul, MN (US); Steffen Geißinger, Stuttgart (DE)

(72) Inventors: Ivan Schreter, Mannheim (DE); Shiping Chen, San Francisco, CA (US); David Wein, Saint Paul, MN (US); Steffen Geißinger, Stuttgart (DE)

(73) Assignee: SAP SE, Walldorf (DE)

( * ) Notice: Subject to any disclaimer, the term of this patent is extended or adjusted under 35 U.S.C. 154(b) by 331 days.

(21) Appl. No.: 14/552,914

(22) Filed: Nov. 25, 2014

(65) Prior Publication Data
US 2016/0147778 A1    May 26, 2016

(51) Int. Cl.
*G06F 17/30* (2006.01)

(52) U.S. Cl.
CPC .. *G06F 17/30371* (2013.01); *G06F 17/30368* (2013.01)

(58) Field of Classification Search
CPC ............... G06F 17/30371; G06F 17/30368
USPC .......................................................... 707/674
See application file for complete search history.

(56) References Cited

U.S. PATENT DOCUMENTS

| | | | | |
|---|---|---|---|---|
| 5,493,663 A * | 2/1996 | Parikh | ................. | G06F 12/123 711/159 |
| 5,664,139 A * | 9/1997 | Spurlock | ............ | G06F 12/0292 711/163 |
| 5,778,388 A * | 7/1998 | Kawamura | ......... | G06F 11/1466 707/999.002 |
| 6,675,278 B1 * | 1/2004 | Chowdhary | ........ | G06F 12/0238 711/103 |
| 2003/0135495 A1 * | 7/2003 | Vagnozzi | .......... | G06F 17/30324 |
| 2008/0301256 A1 * | 12/2008 | McWilliams | ....... | G06F 12/0284 709/214 |
| 2009/0164524 A1 * | 6/2009 | Whang | ............. | G06F 17/30345 707/999.202 |

(Continued)

OTHER PUBLICATIONS

"Merging Differentail Updates in In-Memory Column Store" by Krueger et al., dated 2001, 6 pages, pp. 196-201.*

*Primary Examiner* — Kris Mackes
*Assistant Examiner* — Tiffany Bui
(74) *Attorney, Agent, or Firm* — Sterne, Kessler, Goldstein & Fox, PLLC

(57) ABSTRACT

Disclosed herein are system, method, and computer program product embodiments for directly restoring a database from a log volume. An embodiment operates by reading one or more database transaction log records from a log volume. The embodiment then loads from a database table persistent storage one or more pages containing rows in the database table that will be read from or written to by the one or more database transaction log records. The embodiment then loads a dictionary for each column associated with the one or more database transaction log records. The embodiment then applies the one or more database transaction log records directly into the one or more loaded pages and the one or more dictionaries. Each dictionary and page modified in memory is then written to the database table persistent storage when a savepoint operation is performed.

18 Claims, 5 Drawing Sheets

(56) References Cited

U.S. PATENT DOCUMENTS

| | | | |
|---|---|---|---|
| 2011/0035359 A1* | 2/2011 | Bendakovsky | G06F 11/1458 707/640 |
| 2012/0221528 A1* | 8/2012 | Renkes | G06F 17/30315 707/674 |
| 2014/0025651 A1* | 1/2014 | Schreter | G06F 17/30351 707/695 |
| 2015/0261617 A1* | 9/2015 | Choi | G11C 11/5642 714/6.22 |

* cited by examiner

APPLYING A DATABASE TRANSACTION LOG RECORD DIRECTLY TO A DATABASE TABLE CONTAINER

BACKGROUND

Many database systems can be restored after a crash from a log volume. The restoration of a database from a log volume guards against data loss and ensures data consistency. But restoring a database from a log volume is often compute intensive for the database system and causes the database to be unavailable to users for extended periods of time.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for restoring a database from a log volume. An embodiment operates by reading one or more database transaction log records from a log volume. The embodiment then identifies one or more columns in a database table associated with the one or more database transaction log records. The embodiment then loads from a database table storage one or more pages containing rows in the database table that will be read from or written to by the one or more database transaction log records. The embodiment then loads a dictionary for each column associated with the one or more database transaction log records. The embodiment then applies the one or more database transaction log records directly into the one or more loaded pages and the one or more dictionaries. Each dictionary and page modified in memory is then written to the database table storage when a savepoint operation is performed. By applying the one or more database transaction log records directly into the one or more pages and the one or more dictionaries, the computation cost of restoring the database from a log volume may be reduced. In addition, it may reduce or even minimize database downtime for users.

Figure 1:
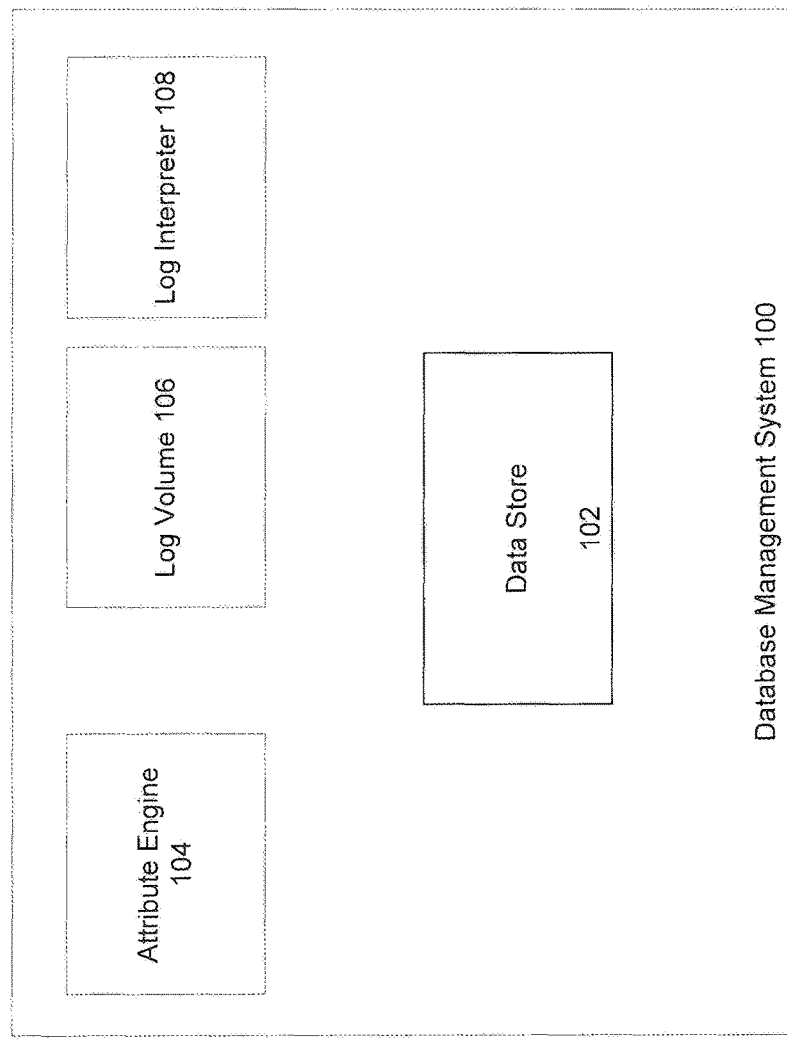
FIG. 1 is a block diagram of a database system that is restorable from a log volume, according to an example embodiment.

FIG. 1 is a block diagram of a database system that is restorable from a log volume, according to an example embodiment. FIG. 1 includes database system 100. Database system 100 includes data store 102. Database system 100 further includes an attribute engine 104, a log volume 106, and a log interpreter 108.

In an embodiment, data store 102 is a repository of a set of data objects. In an example embodiment, data store 102 includes a collection of related tables. Each table is a physical representation of an entity or object that is in a tabular format consisting of columns and rows.

Data store 102 may be stored in a secondary storage that is persistent or non-volatile. For example, data store 102 may be stored on a hard disk drive or in a tape library.

In an embodiment, attribute engine 104 processes queries of data store 102. A query is a request of data store 102. A query may read information from or write information to data store 102. For example, a query may be a data definition language (DDL) statement, e.g. a Structured Query Language (SQL) create statement, or a data manipulation language (DML) statement, e.g. a SQL select or insert statement.

Attribute engine 104 may parse and optimize queries of data store 102. For example, attribute engine 104 may decide when and how to execute a query based on the availability of system resources, e.g. central processing unit (CPU) load or memory space. By optimizing the execution of a query, attribute engine 104 may ensure efficient and fair use of system resources. However, this optimization is often computationally expensive for database system 100.

In an embodiment, log interpreter 108 reads log volume 106 in order to restore data store 102 as discussed below. In an embodiment, log volume 106 includes operational information for one or more database transactions. A database transaction may represent a query of data store 102. Database system 100 may record each query to write information to data store 102 as part of a database transaction in log volume 106. Database system 100 may store information for each database transaction in one or more database transaction log records in log volume 106 using a database specific format. Database system 100 may record the date and time of each database transaction, the type of operation being performed, the column of the table being read or modified, and the value being inserted or modified. Log volume 106 may be stored in a persistent secondary storage, e.g. as a backup on a hard disk drive or a tape library.

Database system 100 may periodically perform a savepoint operation to flush new data in data store 102 to the persistent secondary storage in order to keep the persistent secondary storage up to date. A savepoint operation is also referred to as a checkpoint operation. Because log volume 106 and data store 102 may be stored persistently, database system 100 may be able to restore data store 102 to a given state of time. This is often desired when database system 100 has not performed a savepoint operation for one or more database transactions to data store 102. This may occur when database system 100 crashes.

Database system 100 may not immediately perform a savepoint operation for a database transaction to data store 102 because it is computationally expensive to perform input/output (I/O) operations to the persistent secondary storage. Moreover, database system 100 may not immediately perform a savepoint operation for a database transaction to data store 102 because it would take a relatively long time to complete the associated I/O operations. Instead, database system 100 may store data of an executed query in a memory. Database system 100 may then periodically write the data for the executed query from the memory to the persistent secondary storage as part of performing a savepoint operation. For example, database system 100 may periodically perform a savepoint operation for data of executed queries in a memory to data store 102 on a hard disk drive.

The performance of database system 100 may be improved by not immediately performing a savepoint operation for queries to data store 102. However, because data of executed queries may not be immediately savepointed, there is a possibility of data loss if database system 100 crashes before the in-memory data of the executed queries are written to the persistent secondary storage. Moreover, a database administrator may want to restore data store 102 to a given state in time independent of whether database system 100 crashed. Accordingly, there a need to be able to restore a data store to a given state in time.

In an example embodiment, database system 100 can restore data store 102 by restoring the database to the latest backup and replaying the one or more database transaction log records in log volume 106 through attribute engine 104. First, log interpreter 108 reads the one or more database transaction log records from log volume 106. Second, log interpreter 108 translates each database transaction log record into a format that attribute engine 104 can process as a query to data store 102. In an embodiment, log interpreter 108 may read and translate only database transaction log records that represent queries that write to data store 102. In an example embodiment, log interpreter 108 may determine whether a database transaction log record represents a query that writes to data store 102 by reading a header field associated with the database transaction log record.

In an example embodiment, database system 100 constructs a delta log and sequentially stores each translated database transaction log record in the delta log. A delta log is a virtual file containing a sequential list of translated database transaction log records to be processed by attribute engine 104. The delta log represents the changes made to data store 102 since a previous savepoint in time.

Third, attribute engine 104 processes the constructed delta log to restore data store 102 to a given state in time. This process of restoring a database essentially replays one or more database transaction log records in a log volume as queries through an attribute engine. This process may be memory space inefficient because the database system must restore data store 102 to the last savepoint and construct a delta log from the log volume. Moreover, this process may be computationally expensive because the database system must execute each query in the delta log through the attribute engine. More specifically, this process may computationally expensive because the attribute engine may have to parse and optimize each query in the delta log.

Moreover, because the database system may perform this restoration process slowly, the database system is often inaccessible to database users. This unavailability of the database system results in user dissatisfaction. It also costs users and businesses money because the database system is unable to be handle new database transactions. Accordingly, there is a need for a more computationally and space efficient process for restoring a database from a log volume.

In an example embodiment, a database may be restored from a log volume by directly writing to one or more pages and dictionaries created from a table represented using column-based storage in a persistent secondary storage.

Figure 2:
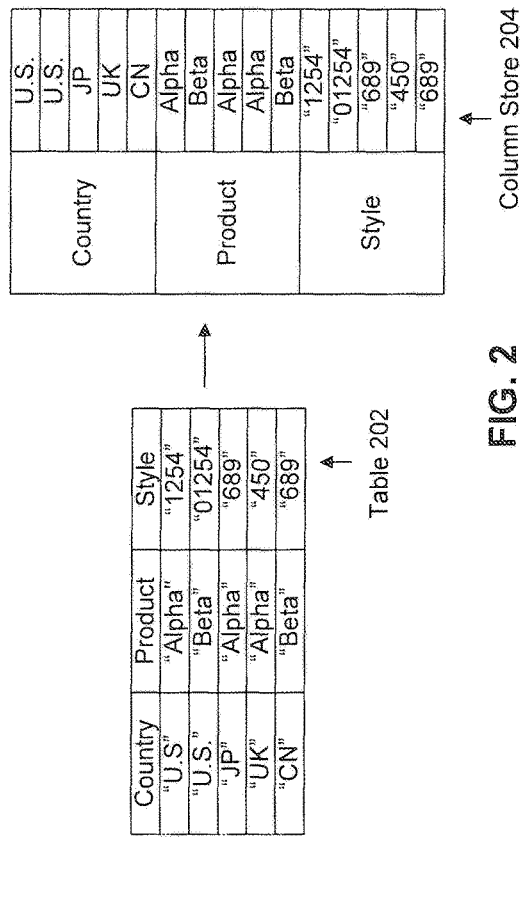
FIG. 2 illustrates a database system that uses column-based storage, according to an example embodiment.

FIG. 2 illustrates a database system that uses column-based storage, according to an example embodiment. FIG. 2 includes table 202. Table 202 is represented using column-based storage as column store 204. In column-based storage, the database system stores data column by column. In contrast, in row-based storage, the database system stores data row by row.

For example, the database system stores the columns of table 202 in contiguous storage locations. For example, the "Country" column is stored first as "U.S.", "U.S.", "JP", "UK", and "CN". The "Product" column is stored second as "Alpha", "Beta", "Alpha", "Alpha", and "Beta". The "Style" column is stored third as "1254", "01254", "689", "450", and "689".

Database systems that use column-based storage are often faster than database systems that use row-based storage. For example, a database system that uses column-based storage is often faster when performing read intensive operations on a large data repository. This is because a column-oriented database system only needs to scan the relevant columns when performing an operation. In contrast, a row-oriented database system must scan the columns of the rows it is reading.

A column-oriented database system is often chosen where operations may be performed on only a few columns. Similarly, a column-oriented database system may be chosen where a table has a large number of columns, or a table has a large number of rows and column operations are typically performed by the database system.

In addition to often being faster than a row-oriented database system, a column-oriented database system may achieve greater data compression than a row-oriented database system. For example, a column-oriented database system may achieve significant data compression where the majority of the columns in the database contain only a few distinct values. A column-oriented database system can achieve this data compression through tokenization or dictionary compression.

In tokenization or dictionary compression, a column may contain many repeated values. For example, a column may contain repeated person names, city names, product numbers, product prices, etc. These repeated values can be replaced by tokens, one per value. The size of the token is just big enough to account for all the unique values, and may be much smaller than the size of the original value.

Tokenization can be used by row-oriented database systems. But tokenization often results in greater data compression when used in column-oriented database systems. For example, when tokenization is block-by-block, a database system may achieve greater data compression if there are more total values from the same column in each block, and this will happen when all the data in a single block comes from the same column.

Figure 3:
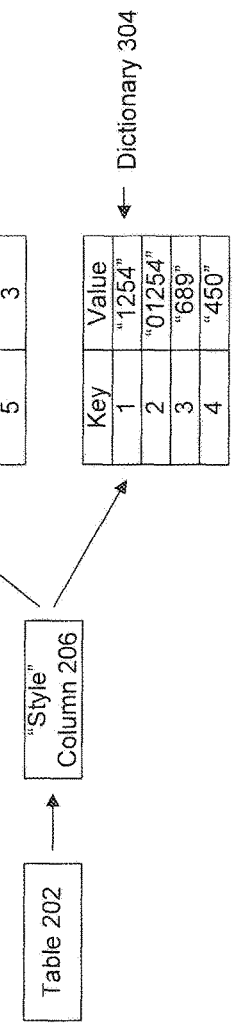
FIG. 3 illustrates a tokenized representation of a database column, according to an example embodiment.

FIG. 3 illustrates a tokenized representation of a database column, according to an example embodiment. FIG. 3 includes table 202 as described above with respect to FIG. 2. Table 202 includes three columns, "Country", "Product", and "Style". "Style" column 206 is compressed using tokenization. A tokenized column may be represented by an index vector and a dictionary. For example, "Style" column 206 is represented by index vector 302 and dictionary 304.

A column may be associated with an index vector using a column descriptor. A column descriptor may be stored with the column. The column descriptor points to the location of the associated index vector.

A column may be associated with a dictionary using a column fragment descriptor. A column fragment descriptor may be stored with the column. The column fragment descriptor points to the location of the associated dictionary.

An index vector contains (value II), key) pairs. A value ID identifies a row in the column. The key is used to determine the value in a row in the column.

A dictionary contains (key, value) pairs. The key maps a value ID to a value in the dictionary. Significant data compression can be achieved by representing repeated values in a column using a single key.

For example, instead of storing "689" directly in rows 3 and 5 of "Style" column 206, the key 3 can be stored in index vector 202 for rows 3 and . The actual value of "689" can then be looked up in dictionary 204. In other words, the key 3 is used to index into dictionary 204. Thus, instead storing "689" twice, a single digit key of 3 is stored twice. This enables the database system to achieve significant data compression where there are many repeated values in a column.

Figure 4:
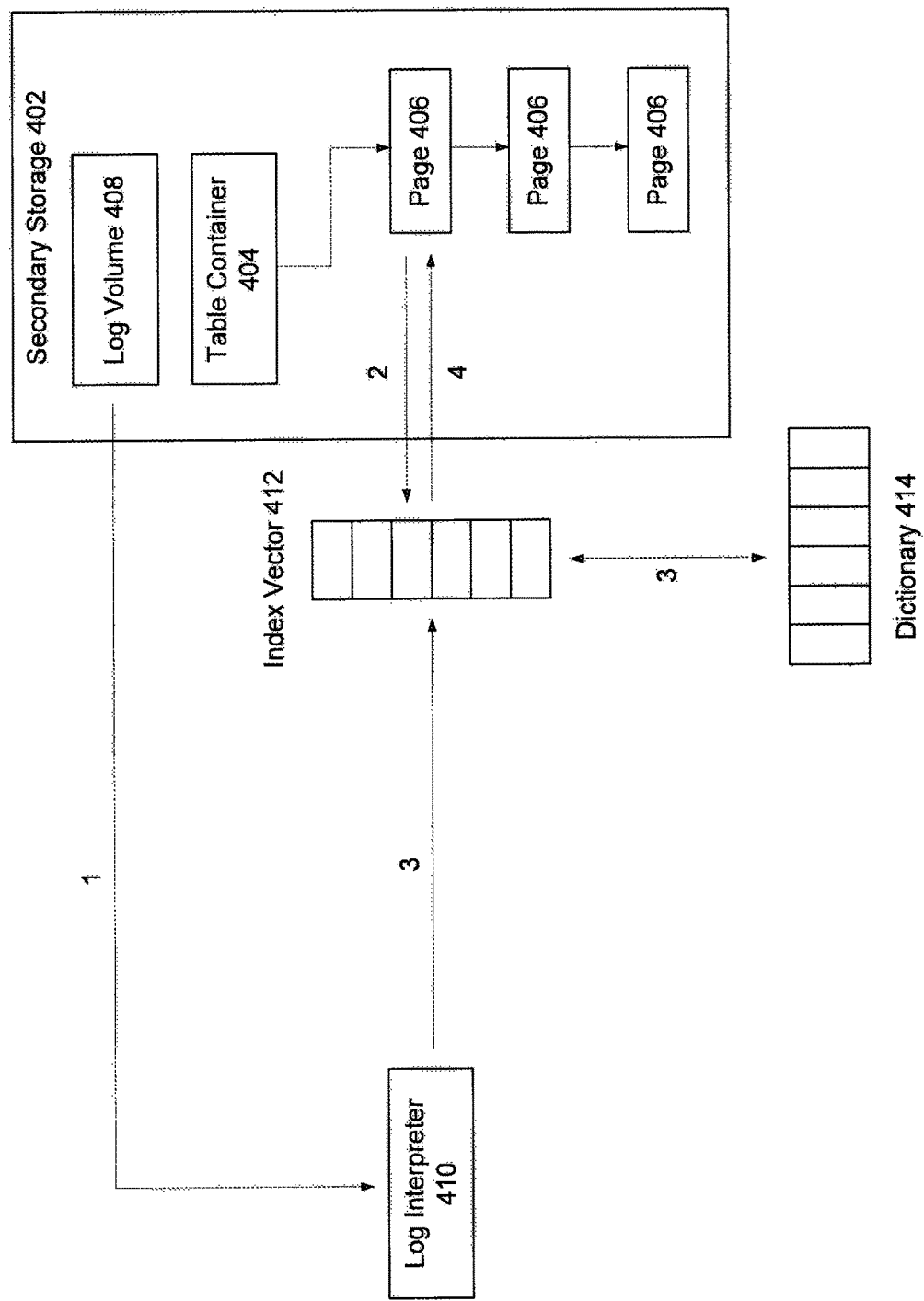
FIG. 4 illustrates restoring a database that uses column-based storage from a log volume, according to an example embodiment.

FIG. 4 illustrates restoring a database that uses column-based storage from a log volume, according to the example embodiment. FIG. 4 includes secondary storage 402, table container 404, one or more pages 406, log volume 408, log interpreter 410, index vector 412, and dictionary 414.

Secondary storage 402 is a persistent storage medium that includes one or more tables of a database that uses column-based storage. Table container 404 is a representation of a table in a database on secondary storage 402. Table container 404 may include one or more pages 406. Each page 406 may represent a unit of storage in secondary storage 402. The one or more pages 406 may be linked together in a chain. Each page 406 may contain a portion of the data in the table represented by table container 404. Database system 100 may interpret a page 406 loaded into memory as a portion of an index vector 412. Database system 100 may perform this interpretation based on how database system 100 stores the one or more pages 406 on secondary storage 402. In an embodiment, database system 100 may maintain a pointer to a column block in a page 406. When database system 100 performs a restoration, database system 100 may interpret the column block as a representation of a portion of index vector 412 when the page 406 is loaded into memory.

Log volume 408 is a log volume such as log volume 106 described above. Log volume 408 may be stored on secondary storage 402. Log volume 408 may include one or more database transaction log records to a data store such as data store 102 described above. Log volume 408 may store the one or more database transaction log records in a database specific format. In an embodiment, log volume 408 may contain information for one or more database transaction log records that have not been savepointed to a data store such as data store 102.

Log interpreter 410 is a log interpreter such as log interpreter 108 described above. Log interpreter 410 reads and interprets the one or more database transaction log records in log volume 408.

Index vector 412 and dictionary 414 represent a column of the table represented by table container 404. FIG. 4 is described in further detail below with respect to method 500 in FIG. 5.

Figure 5:
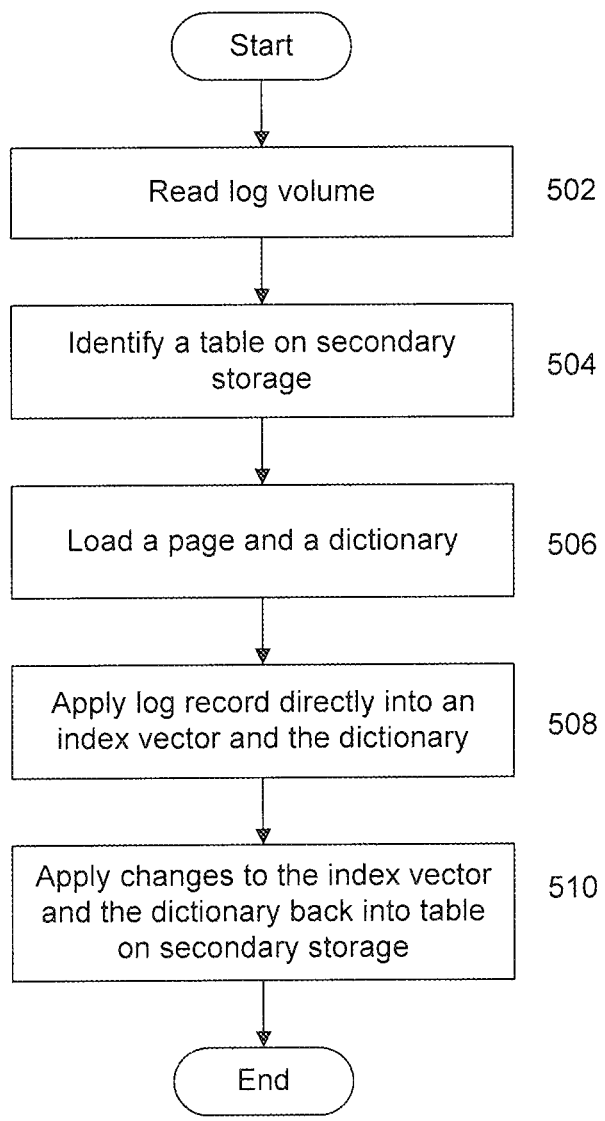
FIG. 5 is a flowchart illustrating a process for restoring a database that uses column-based storage from a log volume, according to the example embodiment of FIG. 4.

FIG. 5 is a flowchart for a method 500 for restoring a database that uses column-based storage from a log volume, according to an embodiment. Method 500 can be performed by processing logic that can comprise hardware (e.g., circuitry, dedicated logic, programmable logic, microcode, etc.), software (e.g., instructions run on a processing device), or a combination thereof. Method 500 is described with reference to FIG. 4.

In step 502 of FIG. 5, the database system reads one or more database transaction log records from a log volume on a secondary storage. As would be appreciated by a person of ordinary skill in the art, the one or more database transaction log records may be represented in the log volume using a database system specific format. The database system may determine the type of database operation each database transaction log record represents, e.g. an insert record, a delete record, a DDL record, etc. In an example embodiment, the database system may determine this information by reading metadata associated with each database transaction log record in the log volume. For example, in FIG. 4, log interpreter 410 reads and interprets one or more database transaction records from log volume 408 on secondary storage 402 as shown by arrow 1.

In step 504 of FIG. 5, the database system identifies on the secondary storage the one or more columns in the one or more tables associated with the one or more database transaction log records in the log volume. This identification may be based on the determination performed by the database system in step 502. In other words, the database system identifies the one or more tables on the secondary storage based on the metadata in the log volume.

In an example embodiment, the database system locates a table container associated with an identified table on the secondary storage. The database system then locates one or more pages representing one or more columns in the identified table that were read or modified in the one or more database transaction log records. For example, in FIG. 4, log interpreter 410 identifies a table represented by table container 404 on secondary storage 402. Log interpreter 410 further identifies one or more pages 406 on secondary storage 402 as shown by arrow 2. The one or more pages 406 represent one or more columns of the table represented by table container 404 that were read or modified based on the one or more database transaction log records in log volume 408.

In step 506 of FIG. 5, the database system loads the one or more pages and one or more dictionaries representing each column in the identified table that was modified in the one or more database transaction log records. The one or more pages include the savepointed column data of the columns being read or modified in the one or more database transaction log records. As described above, the loaded one or more pages may represent portions of one or more index vectors for the columns being read or modified in the one or more database transaction log records. The database system may interpret a column block in the loaded page as part of an index vector.

For example, in FIG. 4, database system 100 loads one or more pages 406 into memory. The one or more pages 406 may represent a portion of index vector 412. Database system 100 also loads dictionary 414. Both index vector 412 and dictionary 414 represent a column in a table represented by one or more pages 406 in table container 404 according to the one or more database transaction log records in log volume 408. This is shown by arrows 3 of FIG. 4.

In step 508 of FIG. 5, the database system directly modifies the contents of each index vector and dictionary based on the one or more database transaction log records in the log volume. In an example embodiment, for each insertion into a column, the database system inserts a new (value ID, key) pair into the index vector. If the value to be inserted into the column is already present in the dictionary, the database system reuses the existing key associated with that value in the dictionary. The database system then inserts the (value ID, existing key) pair in the index vector. If the value to be inserted into the column is not present in the dictionary, the database system inserts a (new key, value) pair into the dictionary and a (value ID, new key) pair into the index vector. Similarly, for each modification or deletion in a column, the database system modifies the corresponding (value ID, key) pair in the index vector and the corresponding (key, value) pair in the dictionary.

In step 510 of FIG. 5, the database system writes the one or more modified pages that represent the index vector and dictionary from step 508 to the secondary storage at the next savepoint. By applying the changes made to pages and dictionaries associated with the identified tables, the database system may restore the database to a given state in time. For example, in FIG. 4, database system 100 updates one or more pages 406 in-memory representation of index vector 412 and dictionary 414 for table container 404 according to the one or more database transaction log records in log volume 408. This is shown by arrow 4 of FIG. 4.

Because the database system writes the changes associated with the one or more database transaction log records directly into one or more index vectors and one or more dictionaries, method 500 is often faster and more space efficient than the replay query process described above. Specifically, method 500 eliminates the need to construct a delta log in memory that represents the one or more database transactions to be redone. This saves memory space and computational cost to the database system. Moreover, method 500 eliminates the need for the attribute engine to parse and optimize queries from the delta log. This may reduce the time to restore the data store. This also reduces database system downtime when the data store is being restored. This increases user satisfaction with the database system and decreases the costs associated with the database system being unavailable.

Figure 6:
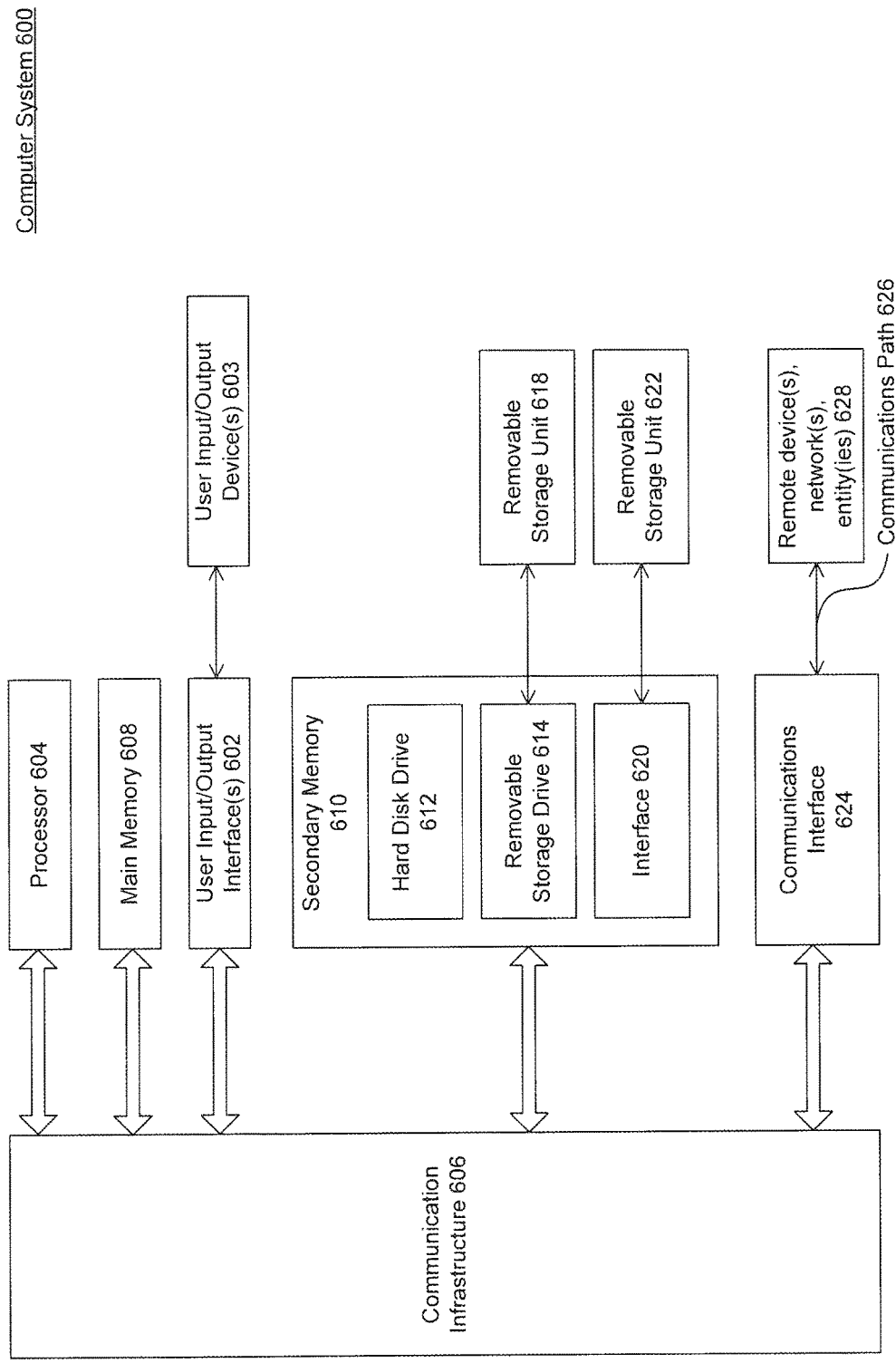
FIG. 6 is an example computer system useful for implementing various embodiments.

Various embodiments can be implemented, for example, using one or more well-known computer systems, such as computer system 600 shown in FIG. 6. Computer system 600 can be any well-known computer capable of performing the functions described herein.

Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interlace (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 6. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in anyway.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method for restoring a database from a log volume, comprising:
   reading, by one or more computing devices, a log record from the log volume, wherein the log record includes information for restoring a database transaction that is not savepointed to a persistent storage;
   interpreting, by the one or more computing devices, a page of a table in the database that is associated with the database transaction as a portion of an index vector that identifies one or more values in a column of the table, wherein the page is stored in the persistent storage;
   performing, by the one or more computing devices, a direct modification of the portion of the index vector and a dictionary based on the log record, wherein the dictionary is associated with the index vector; and
   applying, by the one or more computing devices, the database transaction to the database without replaying the log record as a query, wherein the applying comprises updating the table in the database on the persistent storage based on the modified portion of the index vector and the modified dictionary.

2. The method of claim 1, further comprising:
   identifying the page of the table in the database on the persistent storage, wherein the page is associated with the database transaction.

3. The method of claim 1, the performing the direct modification comprising:
   inserting a key in the portion of the index vector and the dictionary based on the database transaction; and
   inserting a value in the dictionary based on the database transaction.

4. The method of claim 1, the performing the direct modification comprising:
   deleting a key in the portion of the index vector based on the database transaction.

5. The method of claim 1, the performing the direct modification comprising:
   altering a key in the portion of the index vector based on the database transaction.

6. The method of claim 1, wherein the dictionary represents the one or more values in the column of the table.

7. A system, comprising:
   a computer memory; and
   at least one processor coupled to the memory and configured to:
   read a log record from the log volume, wherein the log record includes information for restoring a database transaction that is not savepointed to a persistent storage;
   interpret a page of a table in the database that is associated with the database transaction as a portion of an index vector that identifies one or more values in a column of the table, wherein the page is stored in the persistent storage;
   perform a direct modification of the portion of the index vector and a dictionary based on the log record, wherein the dictionary is associated with the index vector; and
   apply the database transaction to the database without replaying the log record as a query, wherein the applying comprises updating the table in the database on the persistent storage based on the modified portion of the index vector and the modified dictionary.

8. The system of claim 7, wherein the at least one processor is further configured to:
   identify the page of the table in the database on the persistent storage, wherein the page is associated with the database transaction.

9. The system of claim 7, wherein to perform the direct modification of the portion of the index vector and the dictionary based on the database transaction, the at least one processor is configured to:
   insert a key in the portion of the index vector and the dictionary based on the database transaction; and
   insert a value in the dictionary based on the database transaction.

10. The system of claim 7, wherein to perform the direct modification of the portion of the index vector and the dictionary based on the database transaction, the at least one processor is configured to:
    delete a key in the portion of the index vector based on the database transaction.

11. The system of claim 7, wherein to perform the direct modification of the portion of the index vector and the dictionary based on the database transaction, the at least one processor is configured to:
    alter a key in the portion of the index vector based on the database transaction.

12. The system of claim 7, wherein the dictionary represents the one or more values in the column of the table.

13. A non-transitory computer-readable device having instructions stored thereon that, when executed by at least one computing device, causes the at least one computing device to perform operations comprising:
    reading a log record from a log volume, wherein the log record includes information for restoring a database transaction that is not savepointed to a persistent storage;
    interpreting a page of a table in the database that is associated with the database transaction as a portion of an index vector that identifies one or more values in a column of the table, wherein the page is stored in the persistent storage;

performing a direct modification of the portion of the index vector and a dictionary based on the log record, wherein the dictionary is associated with the index vector; and applying the database transaction to the database without replaying the log record as a query, wherein the applying comprises updating the table in the database on the persistent storage based on the modified portion of the index vector and the modified dictionary.

14. The non-transitory computer-readable device of claim 13, further comprising:

identifying the page of the table in the database on the persistent storage, wherein the page is associated with the database transaction.

15. The non-transitory computer-readable device of claim 13, the performing the direct modification comprising:

inserting a key in the portion of the index vector and the dictionary based on the database transaction; and inserting a value in the dictionary based on the database transaction.

16. The non-transitory computer-readable device of claim 13, the performing the direct modification comprising:

deleting a key in the portion of the index vector based on the database transaction.

17. The non-transitory computer-readable device of claim 13, the performing the direct modification comprising:

altering a key in the portion of the index vector based on the database transaction.

18. The non-transitory computer-readable device of claim 13, wherein the dictionary represents the one or more values in the column of the table.

* * * * *